United States Patent Office 3,316,865
Patented May 2, 1967

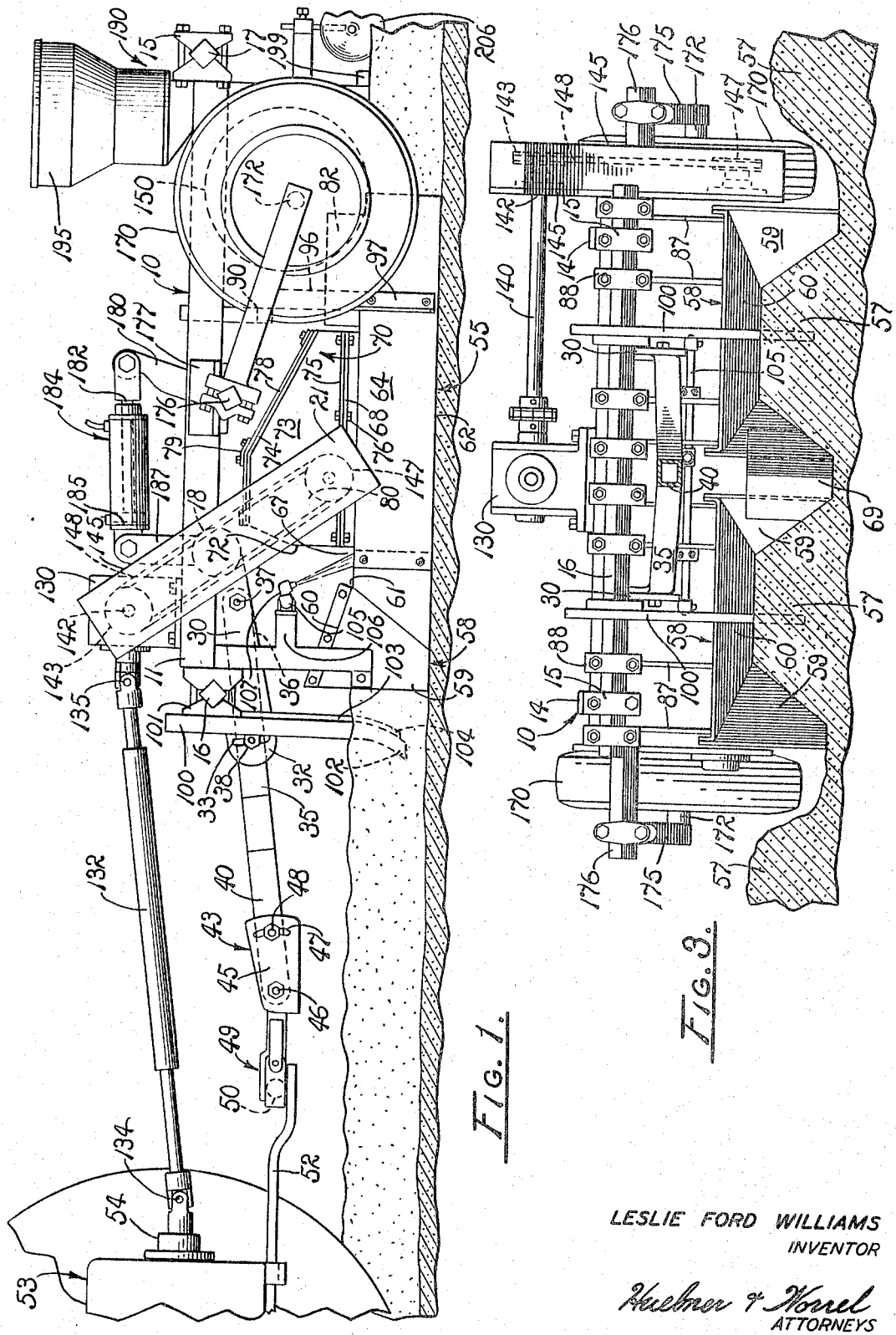

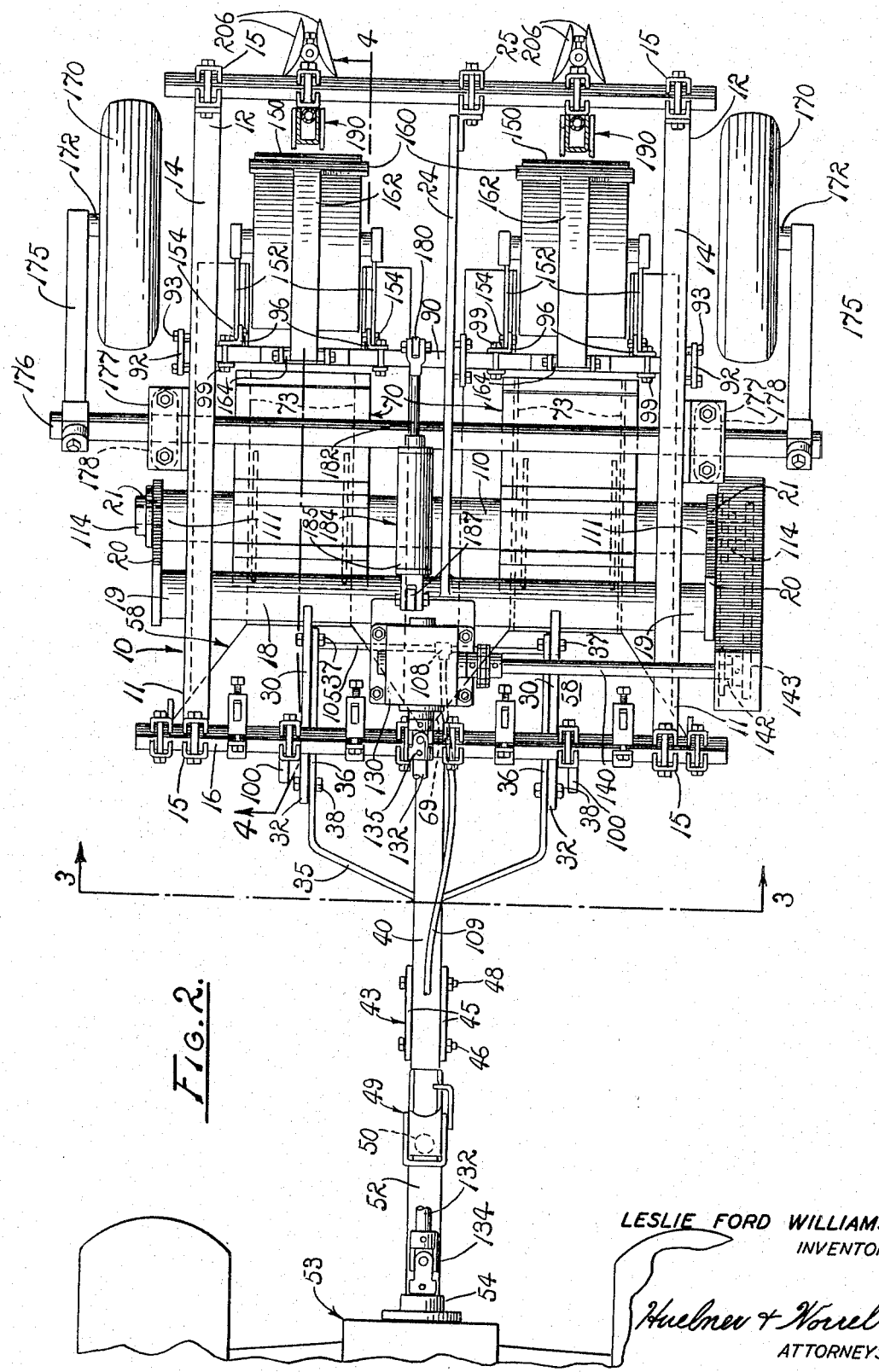

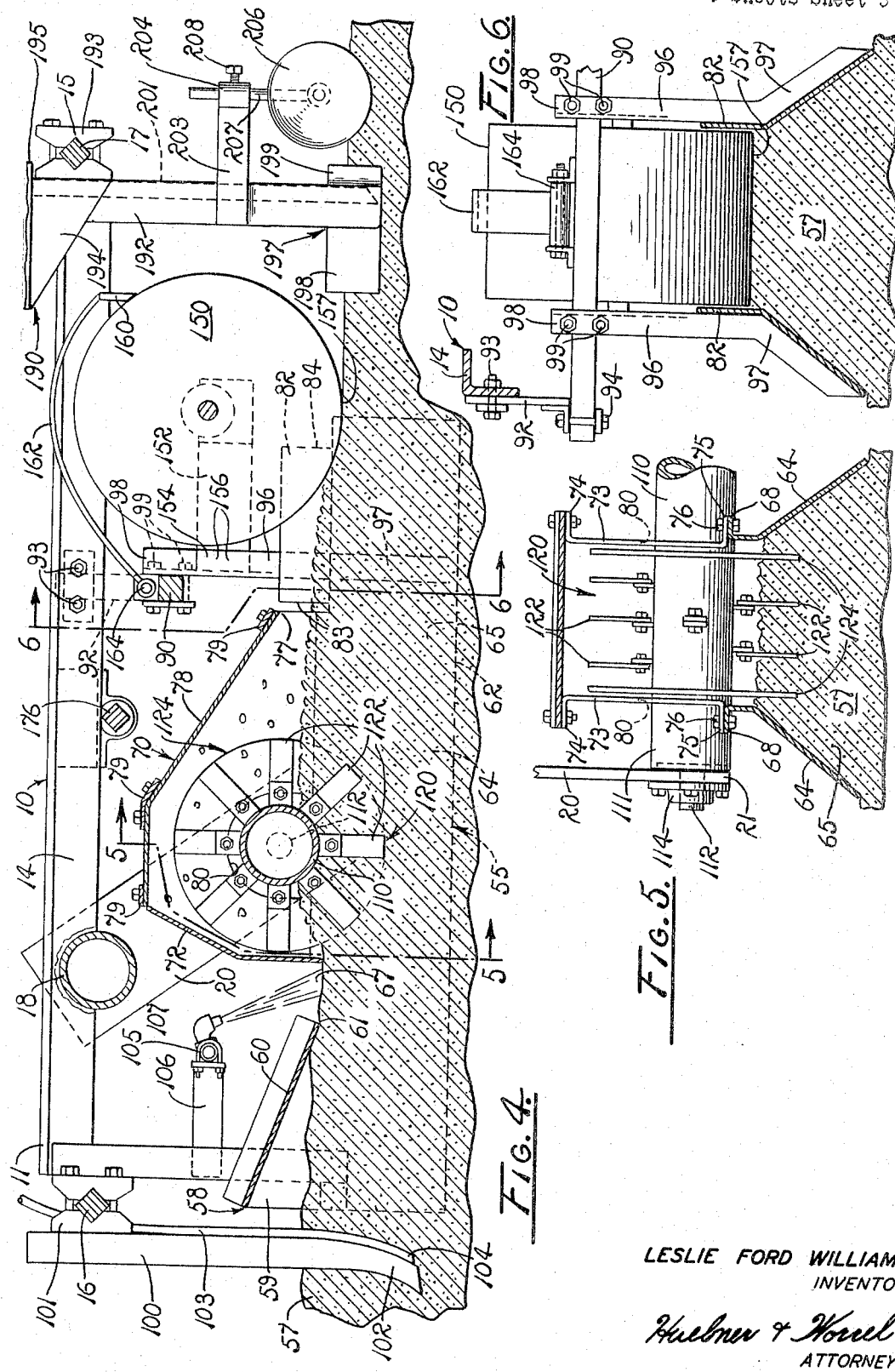

3,316,865
AGRICULTURAL IMPLEMENT
Leslie Ford Williams, P.O. Box 741,
Buttonwillow, Calif. 93206
Filed Aug. 21, 1964, Ser. No. 391,194
5 Claims. (Cl. 111—6)

The present invention relates to an agricultural implement for preparing seed beds arranged in elongated parallel rows and more particularly to such an implement which is capable of simultaneously performing the several functions of applying soil treating materials to the seed bed, mixing such materials into the seed bed, sealing the upper surface of the seed bed to retain such materials therein, and depositing seed in the treated bed while forming and constraining the seed bed to a precise predetermined configuration.

It is conventional practice to form seed beds for crops such as cotton, sugar beets, tomatoes, and the like into elongated rows by employing pairs of transversely spaced soil listing plows. A large amount of spillage of earth passed the plow occurs during the formation of the seed beds. This frequently results in irregularly shaped rows which tend to impair subsequent planting and cultivating operations and irrigation of the crops. After forming the seed bed rows, it has sometimes also been the practice to inject liquid, gaseous or powdered fertilizer into the beds to promote plant growth and to inject pesticidal, fungicidal or herbicidal material into the beds to destroy various plant parasites, fungi, and undesirable weeds and grasses. Heretofore it has usually been necessary to inject such materials below the surface of the soil to prevent or minimize the escape of such materials which frequently are relatively volatile. The ejecting tools cause a trench to be formed along the seed bed which tends to push the sides of the rows outwardly into the furrows between the rows. It is desirable that the spaces between the rows be maintained free of any obstructions for travel of implement wheels and subsequent irrigation. In many instances, the seed beds must be re-shaped by a subsequent operation which causes much of the herbicidal material previously injected to be lost, resulting in higher costs and ineffective soil treatment.

Therefore, it is an object of the present invention to provide an agricultural implement which is capable of forming and constraining a seed bed in its desired configuration during the injection of pesticidal, fungicidal, herbicidal, fertilizing or other material into the bed.

Another object is to provide such an agricultural implement which is capable of injecting such material with a minimum of deformation to the seed bed.

Another object is to provide an agricultural implement of the character described which is effective to provide substantially complete absorption of fertilizer, pesticidal, fungicidal, herbicidal and like material into the soil.

Another object is to provide an agricultural implement which effectively seals such material into the seed bed concurrently with the injecting and forming operations with a minimum of seed bed disturbance or distortion.

Another object is to provide an agricultural implement which permits both subterranean and surface application of seed bed treating material and provides substantially complete intermixing and absorption of such material into the soil.

Other objects and advantages of the present invention will subsequently become more clearly apparent upon reference to the following description in the specification.

In the drawings:

FIG. 1 is a side elevation of the agricultural implement of the present invention shown in an operating position and connected to a prime mover such as a tractor or the like.

FIG. 2 is a top plan view of the agricultural implement of FIG. 1.

FIG. 3 is a front elevation and partial section of the agricultural implement taken generally along the line 3—3 of FIG. 2.

FIG. 4 is a somewhat enlarged fragmentary upright longitudinal section taken along the line 4—4 of FIG. 2.

FIG. 5 is a transverse vertical section through the mulching portion of the implement taken on line 5—5 of FIG. 4.

FIG. 6 is a transverse vertical section taken immediately ahead of the rolling portion of the implement on line 6—6 of FIG. 4.

Referring more particularly to the drawings, the agricultural implement embodying the principles of the present invention provides a main frame 10 having predetermined opposite forward and rearward ends 11 and 12. The frame includes a pair of transversely spaced substantially parallel side rails 14 having clamping brackets 15 mounted on the opposite ends thereof. A forward frame bar 16 is disposed in transversely extended interconnecting relation between the side rails by the brackets and a rearward bar 17 is similarly disposed at the rearward end of the frame. A header tube 18 is transversely extended between the side rails and is secured thereto as by welding or the like in rearwardly closely spaced substantially parallel relation to the forward bar 16 of the frame. The header tube provides outer opposite ends 19 extended from their respective side rails, each of which mounts an elongated downwardly and angularly rearwardly extended arm 20 having a lower end 21. An intermediate rail 24 is connected at its forward end to the header tube 18, as by welding or the like, and at its rearward end to the rearward bar 17 of the frame by a bracket 25 similar to the clamping brackets 15, and in such position is disposed in closely spaced substantially parallel relation to the central longitudinal axis of the frame.

As best shown in FIGS. 1 and 2, a pair of forwardly and downwardly extended arms 30 are connected at their rearward ends to the header tube 18, as by welding or the like, in transversely spaced symmetrical relation to the center line of the frame. The arms include forward ends 32 having elongated arcuate slots 33 therein. A yoke 35 provides a pair of opposite arms 36 which are pivotally mounted at their rearward ends on the arms 30 closely adjacent to the header tube 18 by pivot bolts 37. A pair of sliding bolts 38 are extended through the arms 36 and through the arcuate slots 33 in the arms 30 for limited vertical movement of the yoke. The forward ends of the arms 36 of the yoke forwardly converge for connection to an elongated draft tongue 40 which mounts thereon an adjustable hitch 43. The hitch provides a saddle member 45 pivotally mounted on the forward end of the draft tongue by a pivot bolt 46. The saddle includes elongated arcuate slots 47 which slidably receive a bolt 48 extended through the tongue and the slots. A connecting member 49 is forwardly extended from the saddle and provides a conventional ball connecting mechanism 50 therein. The connecting member is adapted to be mounted on an elongated draw bar 52 rearwardly extended from a vehicle such as a tractor fragmentarily indicated at 53 in FIG. 1. The vehicle includes a power take-off drive shaft 54 rearwardly extended from the tractor above the draw bar.

A pair of elongated inverted trough-shaped bed forming members 55 are disposed beneath the frame 10 in sliding covering relation to a pair of adjacent seed beds 57 of substantially frusto-pyramidal configuration, as viewed in cross section in FIG. 3. The bed forming members include a forwardly opening funnel portion 58 providing rearwardly converging side and top walls 59 and 60, respectively, the latter of which has a rearward edge 61.

The bed forming members further include a rearward portion 62 which provides rearwardly extended upwardly converging side walls 64. The side walls define an elongated constricted passage 65 which has an upper opening 67 in the bed forming member rearwardly adjacent to the top wall 60 of the forward funnel portion thereof. The side walls 64 include upper outwardly extended flanges 68. The adjacent inner side walls 59 of the forward funnel portions 58 are interconnected by a V-shaped plow 69 secured at its ends to the side walls, as by welding or the like, for movement between the rows to list soil into the funnel portions of the bed forming members.

An upper housing 70 is mounted on the rearward portion 62 of the bed forming members and provides a forward wall 72, the lower edge of which defines the rearward edge of the upper opening 67. As best shown in FIG. 5, the housing includes a pair of side walls 73 having upper and lower outwardly turned flanges 74 and 75, respectively. The lower flanges are connected by the bolts 76 or the like to the upper flanges 68 of the side walls 64. The side walls 73 have a rearwardly declining edge 77. A cover 78 of flexible belting material is disposed over the housing 70 and constrained thereon by a plurality of transversely extended straps 79 of substantially rigid material bolted at their opposite ends to the upper flanges 74 of the side walls 73. The side walls 73 include semi-circular apertures 80 disposed in precise transversely aligned relation. A pair of upper extensions 82 for the rearward side walls 64 provide forward ends 83 rearwardly closely spaced to the rearward end of the housing and rearward ends 84 terminating short of the rearward end of the side walls 64 of the rearward portion 62 of the bead forming members.

As best shown in FIG. 3, a plurality of forward hanger bars 87 are employed rigidly to connect the forward funnel portion 58 of the bed forming members 55 to the forward end 11 of the main frame 10. The forward hanger bars are rigidly secured, as by welding or the like, to the top wall 60 of the forward funnel portion and at their upper ends are individually connected to the forward bar 16 of the frame by a plurality of clamping brackets 88 releasably fastened thereto in a manner similar to the brackets 15. The rearward portions 62 of the bed forming members 55 are supported on a cross bar 90 suspended below the side rails 14 of the frame by depending arms 92 connected at their upper ends to the side rails 14 by bolts 93 and at their lower ends to the cross bar by bolt and bracket assemblies, as shown in FIG. 6. A pair of rearward hanger bars 96 having angulated lower ends 97 corresponding ot the angularity of the side walls 64 and secured thereto, as by welding or the like, provide upper ends 98 rigidly fastened to the cross bar 90 by a dual bolt and clamp arrangement 99, as shown in FIG. 4.

A pair of digging tools 100 are individually mounted in depending relation on the forward bar 16 of the frame 10 by a pair of clamping brackets 101 releasably fastened to the bar in a manner similar to the brackets 15 and 88. The digging tools provide forwardly, arcuately curved lower ends 102 which are individually disposed immediately ahead of the funnel portion 58 of the bed forming members 55 in substantially vertical planes aligned with the longitudinal centers of their respective seed beds 57 and bed forming members. An elongated material discharge tube 103 is mounted, as by welding or the like, on the rear of each of the digging tools and provides a lower nozzle end 104 opening adjacent to the lower end 102 of the digging tool. The discharge tube is adapted to be connected at its opposite end, not shown, to a source of liquid, gaseous or powdered fertilizer, pesticide, fungicide, herbicide, or similar material under pressure on the vehicle 53 or on an associated vehicle.

As best shown in FIG. 3, an elongated fluid manifold 105 is mounted by a pair of horizontal arms 106 rearwardly extended from a pair of the forward hanger bars 87 between the main frame 10 and the bed forming members 55. A pair of nozzles 107 are individually mounted on the opposite ends of the manifold and are directed rearwardly downwardly toward the upper openings 67 into the passages 65 of the bed forming members 55. As best shown in FIG. 2, a T fitting 108 is disposed within the manifold intermediate its ends for connection with an elongated forwardly extended supply conduit 109 connected at its opposite end to the same or an independent source of liquid, gaseous or powdered fertilizer, pesticide, fungicide, herbicide, or similar material under pressure, as the material discharge tube 103.

An elongated tubular member 110 is transversely extended through the aligned semi-circular apertures 80 of the upper housing 70 and provides opposite ends 111 from which are extended stub axles 112. The axles are extended through and are supported on the lower ends 21 of the arms 20 by a pair of bearing caps 114 individually mounted on the lower ends of the arms. The tubular member has a pair of mulching wheels 120 individually disposed within the upper housings 70. Each of the mulching wheels of the tubular member is formed by a set of a plurality of blades 122 radially extended from the periphery of the tubular member. A pair of discs 124 are mounted on each of the mulching wheels on either side of the blades in closely spaced relation to the side walls 73 of the housings. As best shown in FIG. 5, the blades are successively disposed during rotation in soil penetrating relation with the upper crested portion of their respective seed beds 57. It is noted that the lower ends 102 of the digging tools 100 are preferably extended nearly twice as far into soil penetration within the seed beds 57 as the lower periphery of their respective mulching wheels.

As best shown in FIGS. 1 and 2, the mulching wheels 120 are power driven from the power take-off drive shaft 54 on the vehicle 53. A directional change gear box 130 is mounted on the forward end of the main frame 10 and is connected to the power take-off drive shaft by an elongated connecting rod 132 provided with universal joint connections 134 and 135 at its opposite ends. A transversely disposed drive shaft 140 is outwardly extended from the gear box to the right, as shown in FIG. 2, and terminates in an outer end 142 mounting a drive sprocket 143. The outer end of the transverse drive shaft is supported in an elongated plate 145 upwardly extended from the adjacent arm 20. A driven sprocket 147 is mounted on the end of the mulching wheel drive axle 112 in coplanar relation with the drive sprocket 143 around which is disposed an endless drive chain 148.

A pair of cylindrical rollers 150 are disposed in trailing relation to the upper housing 70 within the bed forming members 55. The rollers are rotatably individually supported on a pair of support arms 152 rearwardly extended from the rearward hanger bars 96 by pairs of bolts 154 extended through the hanger bar and through vertically elongated slots 156 in the arms 152. The rollers include lower peripheral portions 157 which are substantially aligned with the rearward edge 61 of the top wall 60 of the forward funnel portion 58 of the bed forming members 55 in rolling engagement with the upper crested surface of their respective seed beds 57. A transversely elongated scraper bar 106 is disposed against the upper rearward periphery of the rollers on an integral curved mounting strap 162 pivotally mounted at its forward end on the cross bar 90 by a pivot bolt and bracket arrangement 164.

A pair of implement transporting wheels 170 are disposed on transversely opposite sides of the main frame 10. The wheels are rotatably mounted on axles 172 extended from the lower ends of a pair of pivot arms 175. The upper ends of the pivot arms are individually mounted on the ends of a transversely disposed rocker bar 176 by clamping brackets 177. The rocker bar is pivotally supported beneath the side rails 14 of the main frame by bearing blocks 178 bolted to the outer surfaces of the side rails. The rocker bar includes an upstanding lever arm 180 intermediate its ends, the upper end of which is pivotally connected to the rod end 182 of an hydraulic jack 184. The hydraulic jack includes a cylinder end 185 pivotally mounted on an upstanding arm 187 rigidly secured to the header tube 18. The hydraulic jack is connected through appropriate conduits, not shown, to a source of hydraulic fluid under pressure and to controls on the vehicle 53 for extending and retracting the rod end 182 thereof. When retracted as in FIG. 1, the jack disposes the implement transporting wheels in a carrying position elevated from the rows to permit operation of the implement. When the jack is extended, the wheels are lowered to elevate the main frame 10 and the bed forming members 55 for transport.

As best shown in FIGS. 1 and 4, a pair of seed planting mechanisms generally indicated by the reference numeral 190 are adapted to be mounted in the present embodiment on the rearward end 112 of the frame 10 in individually superimposed relation to the seed beds 57. However, it is conceivable that the planting mechanisms could be disposed on the frame ahead of their respective rollers 150. Each of the planting mechanisms provides an elongated substantially U-shaped support channel 192, as viewed in cross section, which is mounted at its upper end by a clamping bracket 193 on the rearward bar 17 of the frame. A pair of triangular shaped plates 194 are mounted in forwardly extended relation from the upper end of the channel rigidly to support thereon a seed hopper 195. As best shown in FIG. 4, the lower end of the channel mounts a seed furrow blade 197 having a single forwardly extended nose portion 198 and a pair of opposite rearwardly outwardly angularly extended wing portions 99. An elongated tube 201 is mounted within the channel for connection at its upper end to the seed hopper 195 and at its lower end opens within the space between the wing portions of the furrow blade. An arm 203 is rigidly mounted on the channel intermediate its ends and provides a rearwardly extended sleeve portion 204. A pair of furrow covering discs 106 are rotatably mounted immediately behind the furrow blade 197 on an elongated shaft 207 adjustably extended through the sleeve 204. The shaft is held in adjusted position by a locking set screw 208 screw-threadably disposed through the sleeve. As best shown in FIG. 2, the planes of the discs rearwardly converge with their rearward peripheries substantially touching a plane passing through the nose portion 198 of their respective furrow blades 197 and the longitudinal center of their seed beds 57.

OPERATION

The operation of the described embodiment of the subject invention is believed to be clearly apparent and is briefly summarized at this point. During transport of the implement, the hydraulic jack 184 is extended to lower the wheels in implement supporting relation. The connecting member 49 of the hitch 43 is connected to the draw bar 52 of the vehicle 53 in towing relation therewith. Such connection is facilitated by the adjustable saddle 45 by appropriate loosening of the pivot and slide bolts 37 and 38 and 46 and 47, respectively. After positioning the implement in a field, the bed forming members 55 are disposed in longitudinally aligned relation with a pair of adjacent rows which have been roughly formed by conventional furrowing methods. The hydraulic cylinder 184 is then retracted so as to raise the transporting wheels 170 to their upper carrying positions which simultaneously lowers the bed forming members 55 into earth engagement. Further adjustment of the draft tongue 40 through the adjustable hitch 43 can then be made in the above described manner so as precisely to position the bed forming members in the desired substantially horizontal relation with the rows during forward movement behind the vehicle 53.

The power take-off drive shaft 54 is engaged on the vehicle 53 to rotate the mulching wheels 120 through the gear box 130, transverse drive shaft 140 and drive chain 148. Also, the source of soil treating material on the vehicle is actuated to provide a flow through the tubes 103 and outwardly of the nozzle ends 104 thereof and into the soil of the seed beds 57. The same soil treating material may be caused to flow through the manifold 105 and outwardly of the nozzles 107 onto the upper crested portion of the seed beds 57 through the upper opening 67 in the bed forming members 55. It is apparent that the tubes 103 and the manifold 105 can be connected to the same or different sources of soil treating material as may be desired. Upon forward movement of the vehicle and implement of the present invention, the digging tools 100 create a trench within the seed bed so as to accommodate the injection of soil treating material from the nozzle ends 104 of the discharge tubes 103. Concurrently, the side walls 59 and plow 69 between the bed forming members are operative to funnel soil rearwardly into the rearward portion 62. Material injected into the seed bed by the tubes 103 is effectively sealed therein by compression of the upper crested portions of the seed beds by the rearward edges 61 of the funnel portions 58 of the bed forming members 55. The seed beds 57 are thus formed in precise, transversely, frusto-pyramidal configuration in conformance with the side walls 64 and the lower rearward edge 61 of the top wall 60 as the bed forming member is passed along the rows. Also, during such movement, the upper crested portions of the seed beds are continuously subjected to the spray from the nozzles 107 which is substantially completely intermixed and absorbed into the soil of the seed bed immediately by the following mixing action of the mulching wheels 120. During such mixing action, substantially all of the soil treating material is deposited and absorbed within the soil by virtue of the enclosed upper housings 70 and the discs 124 which substantially trap and constrain all the soil being stirred within the upper housings. The discs thereby prevent any significant extent of escape of treated soil outwardly through the semi-circular apertures 80 of the housing.

During further movement of the implement, the treated upper portions of the seed beds are immediately sealed by the rollers 150. The compaction forces generated by the roller which normally would tend to crush or deform the seed bed has no such destructive effect by virtue of the confining action of the side walls 64 of the rearward portion 62 of the bed forming members 55. The mulching wheels 120 are similarly prevented by the side walls 64 from deforming the seed beds. The seed furrow blades 197 follow their compression rollers to form a shallow trench or furrow in the crested portion of the seed beds within which seeds gravitating from the seed hopper 195 through the tube 201 are deposited. Such shallow furrow is then immediately closed by the listing effect of the discs 206.

In view of the foregoing, it is apparent that the structure of the present invention has provided an improved implement for preparing seed beds which simultaneously injects and applies, mixes, and seals soil treating materials into the seed bed while forming and constraining the seed bed to a precise predetermined configuration. All such operations are efficiently performed without having the usual destructive effect on the seed bed as experienced with conventional practice. The implement permits the variously described operations to be completed during a single pass over the rows including seed bed preparation, fertilization, herbicide application, insecticide application, planting, and bed compaction.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An agricultural implement for preparing seed beds arranged in elongated rows comprising a frame adapted for earth traversing movement in a predetermined forward direction of travel longitudinally along such rows; an elongated inverted trough-shaped bed forming member mounted on the frame providing a forwardly opening funnel portion and a rearward portion providing a constricted passage longitudinally aligned with said rows and individually engaging the rows in supporting relation to the frame during said movement thereof, said bed forming member providing an upper opening between said funnel portion and said rearward portion; a nozzle mounted on the frame adapted for connection to a source of flowable soil treating material for discharge through said opening against the seed bed; a soil mulching wheel rotatably mounted on the frame within the bed forming member rearwardly of said upper opening having a plurality of radially extended blades in earth penetrating relation to the rows to insure intermixing and substantially complete absorption of said soil treating material into the seed bed, said mulching wheel including a pair of transversely spaced discs on opposite sides of the blades to constrain the soil being mulched therebetween; powered means borne by the frame having driving connection to said mulching wheel; and a roller rotatably mounted on the frame in following relation to said mulching wheel having a lower periphery in rolling engagement with the seed bed and disposed within said bed forming member.

2. An agricultural implement for preparing seed beds arranged in elongated rows comprising a frame adapted for earth traversing movement in a predetermined forward direction of travel longitudinally along such rows; an elongated inverted trough-shaped bed forming member mounted on the frame providing a forwardly opening funnel portion and a rearward portion providing a constricted passage longitudinally aligned with said rows and individually engaging the rows in supporting relation to the frame during said movement thereof, said bed forming member providing an upper opening between said funnel portion and said rearward portion; a nozzle mounted on the frame adapted for connection to a source of flowable soil treating material for discharge through said opening against the seed bed; a soil mulching wheel rotatably mounted on the frame within the bed forming member rearwardly of said upper opening having a plurality of radially extended blades in earth penetrating relation to the rows to insure intermixing and substantially complete absorption of said soil treating material into the seed bed, said mulching wheel including a pair of transversely spaced discs on opposite sides of the blades to constrain the soil being mulched therebetween; powered means borne by the frame having driving connection to said mulching wheel; a roller rotatably mounted on the frame in following relation to said mulching wheel having a lower periphery in rolling engagement with the seed bed and disposed within said bed forming member; and implement support wheels pivotally mounted on the frame between a lower implement transporting position with the bed forming member elevated in earth clearing relation, and an upper carrying position to permit said row engagement of the bed forming member and seed planting means mounted on the frame in trailing relation to said roller.

3. An agricultural implement for preparing seed beds arranged in elongated rows comprising a frame adapted for earth traversing movement in a predetermined forward direction of travel longitudinally along such rows; a bed forming member mounted on the frame individually engaging the rows in supporting relation to the frame during said movement thereof and providing an upper opening therethrough; a nozzle mounted on the frame adapted for connection to a source of flowable soil treating material for discharge through said opening against the seed bed; a soil mulching wheel rotatably mounted on the frame within the bed forming member rearwardly of said upper opening and having a plurality of radially extended blades in earth penetrating relation to the rows to insure intermixing and substantially complete absorption of said soil treating material into the seed bed, said mulching wheel including soil constraining means on opposite sides of the blades in soil penetrating relation to constrain the soil being mulched therebetween; and a roller rotatably mounted on the frame in following relation to said mulching wheel having a lower periphery in rolling engagement with the seed bed and disposed within said bed forming member.

4. A soil mulching wheel adapted to prepare seed beds and the like arranged in elongated rows comprising a hub mounted for rotation about a substantially horizontal axis transversely of the seed beds and for travel therealong, a plurality of earth penetrating blades outwardly extended from the hub, and soil constraining means mounted on said hub for rotation therewith on opposite sides of the blades in earth penetrating relation to constrain the soil mulched therebetween by the blades.

5. The soil mulching wheel of claim 4 in which said soil constraining means comprises a pair of transversely spaced discs.

References Cited by the Examiner

UNITED STATES PATENTS

| | | | |
|---|---|---|---|
| 1,847,327 | 3/1932 | Bateman | 111—81 |
| 2,729,157 | 1/1956 | Webb | 172—176 |
| 2,753,782 | 7/1956 | Chattin | 47—1 X |
| 2,975,842 | 3/1961 | Mostrong | 172—252 |
| 3,121,973 | 2/1964 | Phillips et al. | 47—9 |
| 3,128,833 | 4/1964 | Johnson et al. | 172—245 |
| 3,170,421 | 2/1965 | Norris et al. | 111—1 |
| 3,180,290 | 4/1965 | Kappelmann et al. | 111—85 |
| 3,194,194 | 7/1965 | Phelps | 111—6 |
| 3,235,012 | 2/1966 | Johnson et al. | 172—157 |

ABRAHAM G. STONE, *Primary Examiner.*

R. E. BAGWILL, *Assistant Examiner.*